May 26, 1925.
R. E. SPURR
1,539,282
CHUCK
Filed July 2, 1920 3 Sheets-Sheet 1
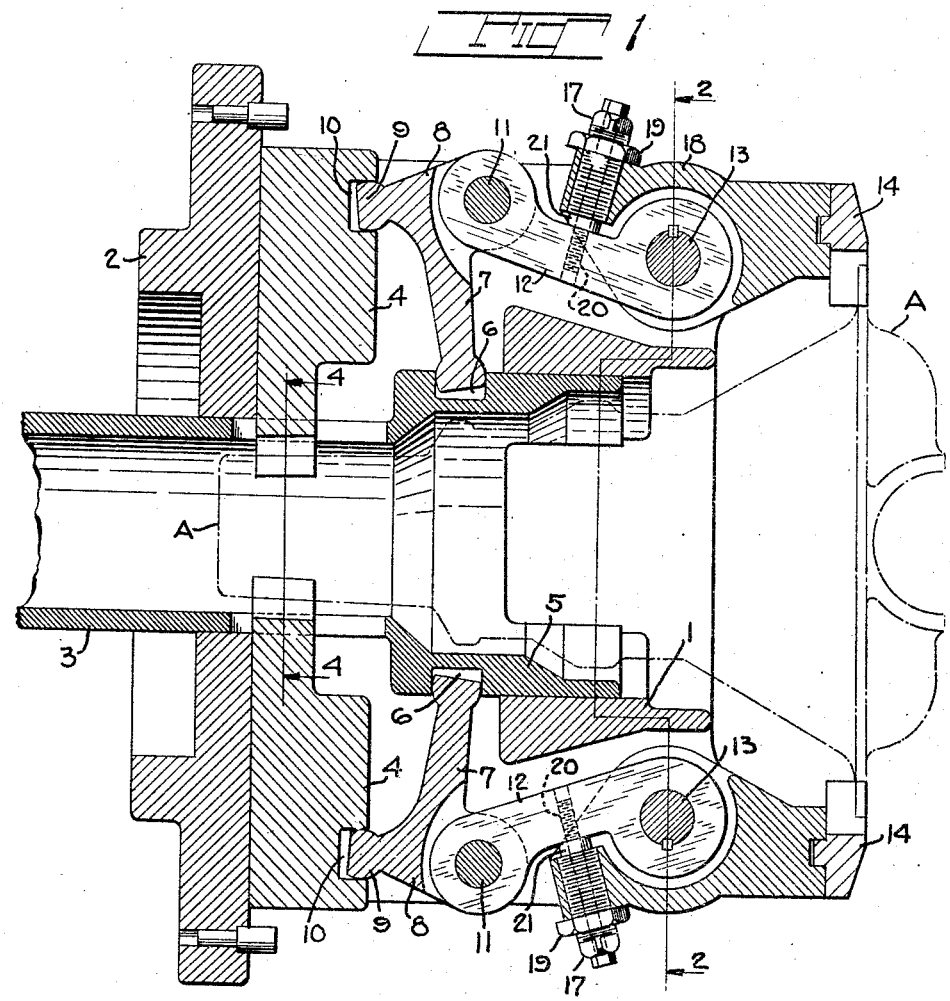
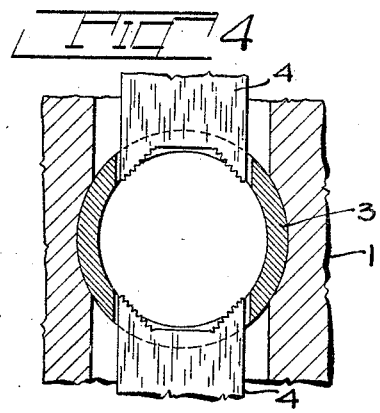
INVENTOR
Robert E. Spurr
BY
ATTORNEY May 26, 1925.  R. E. SPURR  1,539,282
CHUCK
Filed July 2, 1920   3 Sheets-Sheet 2
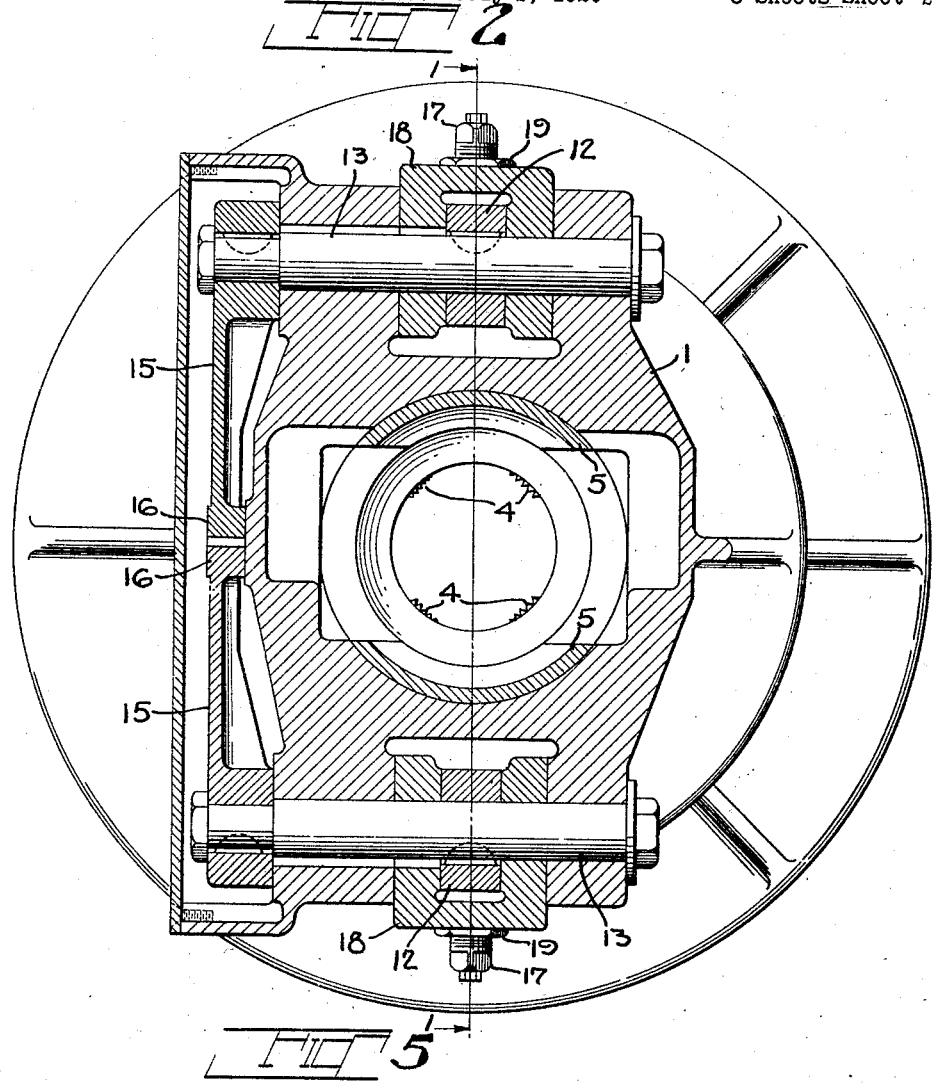
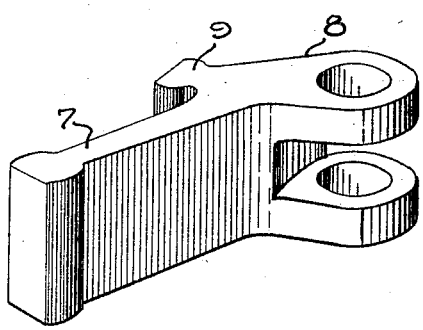
INVENTOR
Robert E. Spurr
BY
ATTORNEY May 26, 1925.
R. E. SPURR
CHUCK
Filed July 2, 1920
1,539,282
3 Sheets-Sheet 3
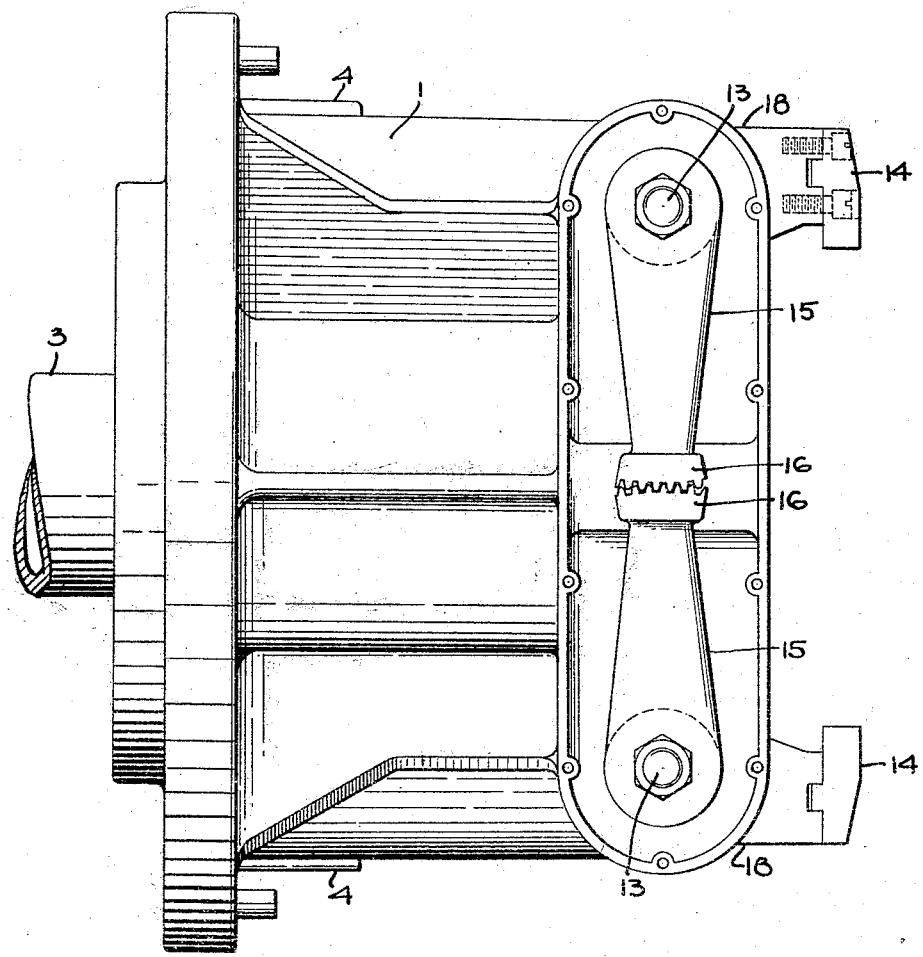
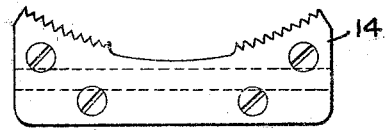
INVENTOR
Robert E. Spurr
BY
ATTORNEY Patented May 26, 1925.

1,539,282

UNITED STATES PATENT OFFICE.

ROBERT E. SPURR, OF DETROIT, MICHIGAN, ASSIGNOR TO DODGE BROTHERS, OF DETROIT, MICHIGAN, A CORPORATION OF MICHIGAN.

CHUCK.

Application filed July 2, 1920. Serial No. 393,620.

*To all whom it may concern:*

Be it known that I, ROBERT E. SPURR, a citizen of the United States, residing at Detroit, Michigan, have invented certain new and useful Improvements in Chucks, of which the following is a clear, full, and exact description.

My invention relates to chucks—such, for instance, as those used in lathes—and my invention has for its object to improve and simplify the construction of this class of devices whereby they are rendered more efficient in use.

A feature of the invention resides in the provision of a chuck having a plurality of sets of jaws, each set acting to automatically center the work. A further feature resides in the provision of a chuck having a plurality of sets of jaws, the jaws of one set having the capability of differential movement with respect to the jaws of another set and in which the jaws of all of the sets move to automatically center the work.

A still further feature of the invention resides in the provision of a chuck having a plurality of sets of jaws operated by a common means, and in which the diameter of the work at the points to be gripped by either set of jaws does not affect the ability of another set of jaws connected to the first set to properly grip the work.

Other features and advantages will become apparent from the following detailed description and claims when taken in connection with the accompanying drawings, in which—

Fig. 1 is a sectional view on the line 1—1, Fig. 2;

Fig. 2 is a sectional view on the line 2—2, Fig. 1.

Fig. 3 is a side elevation;

Fig. 4 is a section on the line 4—4, Fig. 1;

Fig. 5 is a detail of one of the bell crank levers for operating the jaws; and

Fig. 6 is a detail of one of the jaws.

Referring to the drawings, the chuck consists of a supporting structure designated generally by the numeral 1. This supporting structure has a circular plate 2 for connecting the chuck to the main body of the lathe. The chuck is longitudinally apertured at its central portion, and through the aperture extending through the plate 2 extends a cylinder 3 operated by air pressure or other power means. The cylinder 3 has cutaway portions at opposite sides thereof, as indicated in Fig. 4, for the purpose of permitting jaws 4—which for convenience may be termed the rear jaws—to approach near enough together to engage the work piece. These jaws are slidably mounted on the plate 2 in any suitable manner. The forward end of the cylinder 3 is provided with an enlarged cylindrical portion 5 having notches 6 cut in diametrically opposite walls thereof, and in the notches 6 are guided the arms 7 of bell-crank levers 8, the other arms 9 of each of said bell-crank levers engaging cutout portions 10 in the jaws 4. Each bellcrank lever 8 is mounted for rocking movement on a fulcrum 11, which fulcrum is supported by one end of a lever 12, said lever being keyed to a fulcrum 13 mounted in the frame 1 of the chuck. The fulcra 13 may be considered fixed fulcra in the sense that they are maintained the same distance apart by the frame 1, although they are permitted limited oscillatory movement in said frame. The fulcra 11, on the other hand, are floating fulcra, and therefore the bell-cranks 8 may oscillate about the fulcra 11 and may revolve about the fulcra 13. At its end, remote from the fulcrum 11, each lever 12 carries a jaw 14 as shown in detail in Fig. 6 and which may be fastened to the lever 12 by screws as shown in Fig. 3, or in any other suitable manner. By reason of the fact that the bell-cranks 8 may both oscillate upon the fulcra 11 and revolve about the fulcra 13, it is clear that if the cylinder 3 moves towards the right, Fig. 1, both sets of jaws, 4 and 14, may move to work engaging position, but the movement of jaws of each set toward the center line of the chuck with the mechanism so far described, would not necessarily be in unison.

In Fig. 1 I have shown a work-piece A in position gripped by the jaws. If this workpiece were of such diameter at its rear portion that the jaws 4 were practically in contact with it when open to their greatest extent, then upon movement of the cylinder 3 to the right there would be no movement of rotation of the bell-cranks 8 about their fulcra 11. As the enlargement 5 moved to the right, however, the fulcra 11 would move away from each other, and the levers 12 would rotate on their fulcra 13, and the jaws 14 would move until they engage the work-piece, and in some cases this movement might be of quite considerable extent. On the other hand, if the work-piece were of such diameter at the points engaged by the forward jaws 14, when they were opened to their greatest extent, then movement of the cylinder 3 would cause practically no rotation of the levers 12 about their fulcra 13, but would cause an oscillation of the levers 8 about their fulcra 11, resulting in the jaws 4 making all the movement necessary to engage the work-piece, the jaws 14 standing practically still. Different diameters of work-piece at the points engaged by the jaws would therefore result in different movements of the jaws.

Although the sets of jaws are capable of differential movement with respect to each other, I nevertheless provide means whereby the work-piece will always be automatically centered. In order to do this, I preferably provide arms 15 which are keyed to the fulcra 13, shown clearly in Figs. 2 and 3, said arms being provided with toothed ends 16 and 16 which interengage, so that the jaws 14 will constantly remain at equal distances from the center line of the chuck. Since the bell-cranks 8 are connected for movement in unison to the cylinder 3 and since these bellcranks are connected to the levers 12, the jaws 4 will likewise constantly maintain themselves at equal distances from the center line of the chuck.

In order to effect adjustment of the jaws, the levers 12 carrying the forward jaws are made in two parts, with means for adjustment therebetween. This adjustment may be of any suitable character, and for the purpose of illustration I have shown a member 17 screw-threaded into the righthand portion 18 of the lever 12 and secured thereto by a lock-nut 19. A bolt 20 is passed through a central aperture in the member 17 and is provided with a screw-threaded portion engaging the lefthand portion of the lever 12. A reduced portion 21, of the member 17, acts as a bearing block between the two parts of said lever.

While I have described and shown a preferred embodiment of my invention, it is to be understood that variations may be resorted to within the spirit thereof and that parts may be used without others.

Having thus described my invention, what I claim and desire to secure by Letters Patent is:

1. In a chuck, the combination with a set of jaws, of means connecting said jaws for movement in unison, said means including a lever for each jaw, a second set of jaws, each individual jaw of said second set connected to an individual jaw of the first set through the medium of one of said levers, and means engaging said levers for moving both sets of jaws.

2. In a chuck, the combination with a plurality of sets of movable work engaging jaws, of fixed fulcra for the jaws of one set, floating fulcra for the jaws of another set, and means for connecting said jaws.

3. In a chuck, the combination with a set of jaws, a fixed fulcrum for supporting each jaw of said set, a second set of jaws, a floating fulcrum for supporting each jaw of said second set, and means for connecting each individual jaw of one set with an individual jaw of the other set.

4. In a chuck, the combination with a set of jaws, a fixed fulcrum for supporting each jaw of said set, a second set of jaws, a floating fulcrum for supporting each jaw of said second set, means for connecting each individual jaw of one set with an individual jaw of the other set, and means for connecting the individual jaws of one of said sets of jaws.

5. In a chuck, the combination with a plurality of sets of movable work engaging jaws, of fixed fulcra, levers carried by said fulcra, each lever having a jaw at one end and a floating fulcrum at the other end, and means carried by the floating fulcra for controlling the jaws of another set.

6. In a chuck, the combination with a plurality of sets of movable work engaging jaws, of fixed fulcra, levers carried by said fulcra, each lever having a jaw at one end and a floating fulcrum at the other end, means carried by the floating fulcra for controlling the jaws of another set, and means for connecting the jaws mounted on the fixed fulcra so that they are constrained to move together to work centering position.

7. In a chuck, the combination with a pair of levers, of fixed fulcra on which said levers are mounted, jaws carried at one end of each of said levers, a floating fulcrum supported by the other end of each lever, an operating lever on each of said floating fulcra, and jaws carried by said operating levers.

8. In a chuck, the combination with a pair of levers, of fixed fulcra on which said levers are mounted, jaws carried at one end of each of said levers, a floating fulcrum supported by the other end of each lever, a bell-crank lever on each floating fulcrum, a jaw connected to one arm of each bell-crank lever, and means for moving said jaws connected to the other end of each bell-crank lever.

9. In a chuck, the combination with a pair of levers, fixed fulcra on which said levers are mounted, jaws carried at one end of each of said levers, a floating fulcrum supporting the other end of each lever, a bell-crank lever on each floating fulcrum, a jaw connected to one arm of each bell-crank lever, means for moving the jaws, cooperatively related to the other end of each bell-crank lever, and means connecting said first-mentioned levers for movement in unison.

10. In a chuck, the combination with a pair of levers, fixed fulcra on which said levers are mounted, jaws carried at the end of each of said levers, a floating fulcrum supported by the other end of each lever, an operating lever on each of said floating fulcra, jaws controlled in their movement by said operating levers, means for moving said operating levers in unison, and means connecting the fixed fulcra compelling movement of said first-mentioned levers in unison.

11. In a chuck, the combination with a support, of a pair of levers mounted for oscillatory movement in said support but fixed with respect to each other, jaws carried at one end of each of said levers, a floating fulcrum supported by the other end of each lever, a bell-crank lever on each floating fulcrum, a jaw connected to one arm of each bell-crank lever, means for moving said jaws cooperatively related to the other arm of each bell-crank lever, arms connected to said oscillatory fulcra, said arms having their ends toothed and engaging each other to compel oscillatory movement of said fulcra in unison.

12. In a chuck, the combination with a plurality of sets of movable work engaging jaws, of means for maintaining the jaws of one set equally distant from the center line of the chuck as said jaws move to work engaging position, means for maintaining the jaws of another set equally distant from the centre line of the chuck as they move to work engaging position, and means for connecting the jaws of one set with those of another set for differential movement.

13. In a chuck, the combination with a set of jaws, of a lever to which each jaw is connected, means connecting the levers for movement in unison and hence the jaws, a second set of jaws, levers connected thereto, means connecting said last-mentioned levers for movement in unison, and means for connecting the sets of levers so that a jaw of one set will move a jaw of another set.

14. In a chuck, the combination with a set of jaws, of a lever to which each jaw is connected, a sleeve common to the levers and to which they are articulated for movement in unison, a second set of jaws, levers connected thereto, oscillatory fulcra fixed with respect to each other to which said last-mentioned levers are connected, interengaging toothed arms connected to said oscillatory fulcra, and means for connecting the sets of levers for differential movement.

15. In a chuck, the combination with a set of jaws, a bell-crank engaging each jaw, means for moving said bellcranks in unison, a second set of jaws, a lever carrying each of said jaws at one end and a fulcrum for a bellcrank at the other end, and means for connecting said levers for movement in unison.

Signed at Detroit, Michigan, this 26th day of June, 1920.

ROBERT E. SPURR.

Witnesses:
J. R. FURSE,
ALFRED H. KNIGHT.